(12) United States Patent
Li et al.

(10) Patent No.: US 6,570,623 B1
(45) Date of Patent: May 27, 2003

(54) OPTICAL BLENDING FOR MULTI-PROJECTOR DISPLAY WALL SYSTEMS

(75) Inventors: Kai Li, Princeton, NJ (US); YuQun Chen, Princeton, NJ (US); Timothy Housel, Hopewell, NJ (US)

(73) Assignee: Princeton University, Princeton, NJ (US)

( * ) Notice: Subject to any disclaimer, the term of this patent is extended or adjusted under 35 U.S.C. 154(b) by 0 days.

(21) Appl. No.: 09/556,669

(22) Filed: Apr. 24, 2000

Related U.S. Application Data

(60) Provisional application No. 60/135,375, filed on May 21, 1999.

(51) Int. Cl.[7] .............................. H04N 9/12; H04N 5/74
(52) U.S. Cl. ..................... 348/383; 348/744; 348/778; 348/785
(58) Field of Search ......................... 348/383, 36, 744, 348/745, 746, 747, 778, 756, 781, 785, 189, 180; 345/1.1, 4, 1.3, 19; H04N 5/66, 9/12, 5/74

(56) References Cited

U.S. PATENT DOCUMENTS

| 3,833,764 A | 9/1974 | Taylor |
| 4,356,511 A | 10/1982 | Tsujimura |
| 4,634,384 A | 1/1987 | Neves et al. |
| 4,974,073 A | 11/1990 | Inova |
| 5,136,390 A | 8/1992 | Inova et al. |
| 5,822,002 A | 10/1998 | Tokoro et al. |
| 6,377,306 B1 * | 4/2002 | Johnson et al. ............. 348/383 |

* cited by examiner

*Primary Examiner*—Sherrie Hsia
(74) *Attorney, Agent, or Firm*—Woodbridge & Associates, P.C.; Richard C. Woodbridge, Esq.; Thomas J. Onka, Esq.

(57) ABSTRACT

A multi-projector video wall system employs a blending frame to blend the overlapping portions of two adjacent images $I_1$ and $I_2$. The blending frame is preferably located a distance $D_{frame}$ from the aperture of the projector and has an optimal half frame width $W_f$ from the axis of the lens of the projector. A camera-based feedback loop can be employed to fine-tune the optical blending by digitally altering the image source.

8 Claims, 6 Drawing Sheets

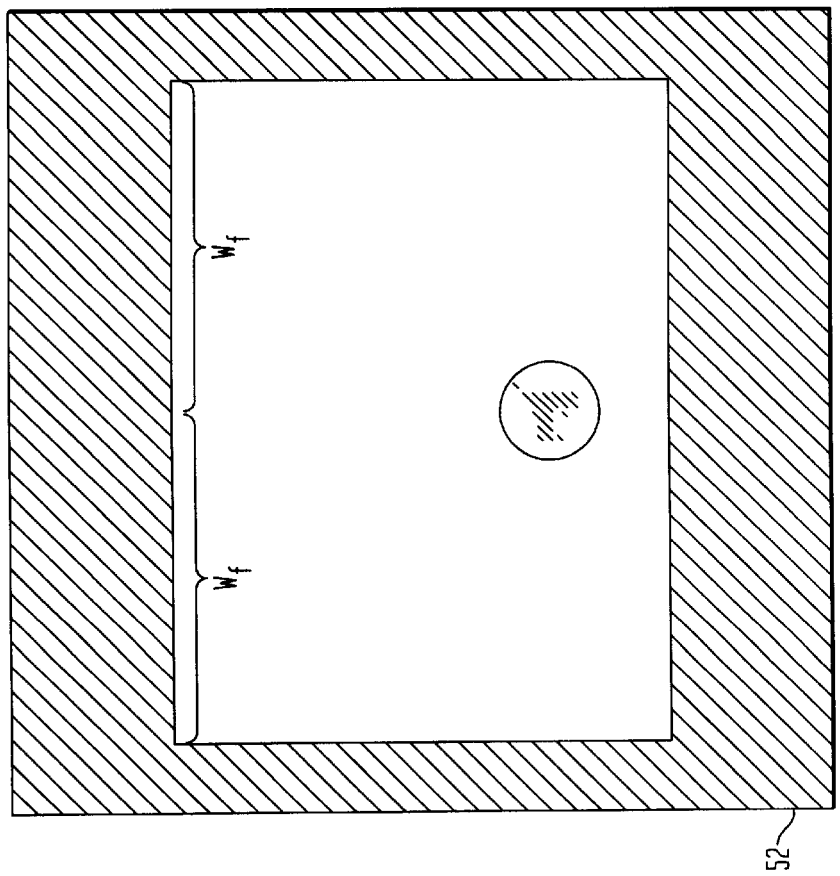
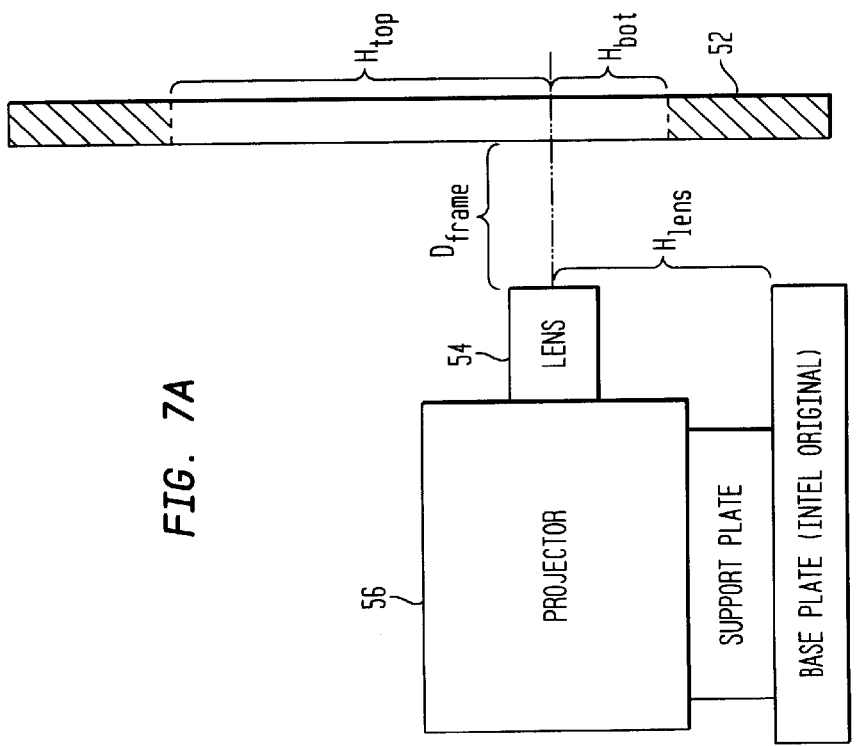

OPTICAL BLENDING FOR MULTI-PROJECTOR DISPLAY WALL SYSTEMS

CROSS REFERENCE TO RELATED APPLICATIONS

This application is based upon and claims the priority date of U.S. Provisional Application Ser. No. 60/135,375 filed on May 21, 1999 and entitled Optical Blending for Multi-Projector Systems the entire contents and substance of which is hereby incorporated by reference.

BACKGROUND OF THE INVENTION

1. Field of the Invention.

Basically described, the invention comprises an apparatus and method for optically blending adjacent images on a video wall as produced by a multi-projector system.

2. Description of Prior Art.

Video walls made of multiple projectors are becoming increasingly popular because of their large format and high resolution. A typical video wall is composed of a large screen and an array of projectors. The projectors project images in a tiled fashion onto the screen by either front or rear projection to deliver high resolution results. To make the construction of the video walls easier, the projection components are usually made modular, thus the projection components are also referred to as cubes. Traditional video walls have seams because of the difficulty in alignment and color balance.

Edge blending is a technique to minimize seams produced at overlapping images. The known technique is to overlap the edges of projected, tiled images and blend the overlapped pixels to smooth the luminance and chromaticity transition from one projected tiled image to another. The current state-of-the-art technique is to use specially designed hardware to modulate the video signals that correspond to the overlapped region. See, for example, the discussions in U.S. Pat. No. 4,974,073 entitled "Seamless Video Display" and issued on Nov. 27, 1990 or in U.S. Pat. No. 5,136,390 entitled "Adjustable Multiple Image Display Smoothing Method and Apparatus" issued on August 4, 1992. The modulation is automatically calculated or manually adjusted so that the combined intensity and color balance in the overlapped region on the screen are as uniform as possible. Furthermore, the transition of the luminance and chromaticity from a non-overlapped region to its adjacent overlapped regions should be smooth in order to avoid undesirable effects such as Mach banding. See, for example, the discussion in "Contour and Contrast", by Ratcliff, F., Scientific American, 226 (6), Q1972, 91–101. Although this approach can modulate the image source, it cannot alter the mapping between image source and luminance of the projector outputs. Consequently, the electrical edge blending approach does not work well with projection devices that leak light energy. For example, this approach does not work well with modern projectors such as Liquid Crystal Display (LCD) or Digital Micro-Mirror Device (DMD) projectors, which leak substantial amounts of light energy when the projected pixels are black. The result is that the effective luminance for a supposedly pitch-black image is not black. This is known as the "non-zero black level" problem. Since projected black images are not completely black on the screen, the overlapped regions are brighter than non-overlapped regions. The electrical edge-blending approach cannot reduce the light energy in the overlapped regions because the video signals are already at the lowest level when projected pixels are black.

Another technique for blending images is to use dichroic filters in an optical lens system such as described in U.S. Pat. No. 4,634,384 entitled "Head and/or Eye Tracked Optically Blended Display System" issued Jan. 6, 1987 to Fernando B. Nevis and Jimmy Paige, and assigned to the General Electric Co. Since this approach operates directly on the light emitted from the projector's light source, it is not affected by the "non-zero black level" problem in modern projectors. In order to use this technique for video wall systems, however, the projector manufacturer must place the filters inside the projector's lens system and provide control mechanisms for adjustment. This approach has proved to be relatively expensive and therefore has limited application.

Other prior art patent references of possible relevance include: U.S. Pat. Nos. 3,833,764; 5,822,002; and 4,356,511.

It was in the context of this prior art that the present invention arose.

SUMMARY OF THE INVENTION

Briefly described, the invention comprises the use of a blending frame to control the degree of intensity reduction in the overlapping region of two images projected by two different projectors in a video wall system. In addition, the invention includes an adaptive technique or algorithm to fine tune the blend result and a camera-based iterative algorithm to fine tune the blend result and to reduce or eliminate the defraction effect. These and other features of the invention will be more fully understood by reference to the following drawings.

BRIEF DESCRIPTION OF THE DRAWINGS

FIG. 7A is a side elevational view of projection system of FIGS. 5 and 6.

FIG. 7B is a front elevational view of a single blending frame such as seen in FIGS. 5, 6, and 7A.

DETAILED DESCRIPTION OF THE PREFERRED EMBODIMENT

During the course of this disclosure, like numbers will be used to identify like elements according to the different figures which illustrate the invention.

Figure 1:
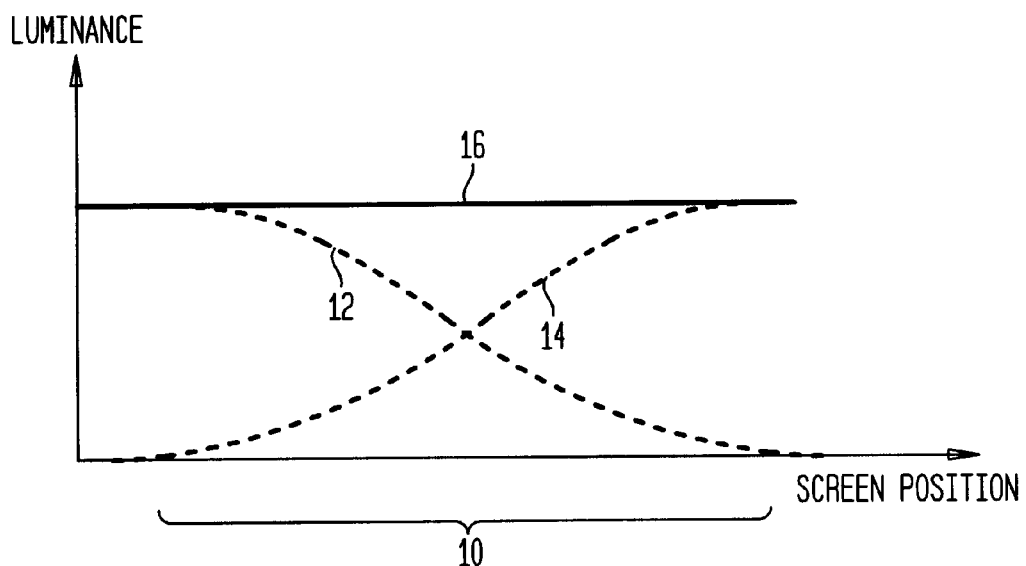
FIG. 1 illustrates the ideal luminance blending of two images projected by two adjacent projectors onto a screen of a video wall where the images overlap in an overlapped region according to the preferred embodiment of the invention.

FIG. 1 illustrates an ideal relative combined luminance (16) produced by two adjacent projectors (12) and (14) in an overlapped region (10). The ideal luminance blending illustrated in FIG. 1 can be achieved by the method and apparatus of the present invention as disclosed herein. FIG. 1 illustrates the case in which the luminance from the left projector (12) is roughly equal to the luminance from the right projector (14).

Figure 2:
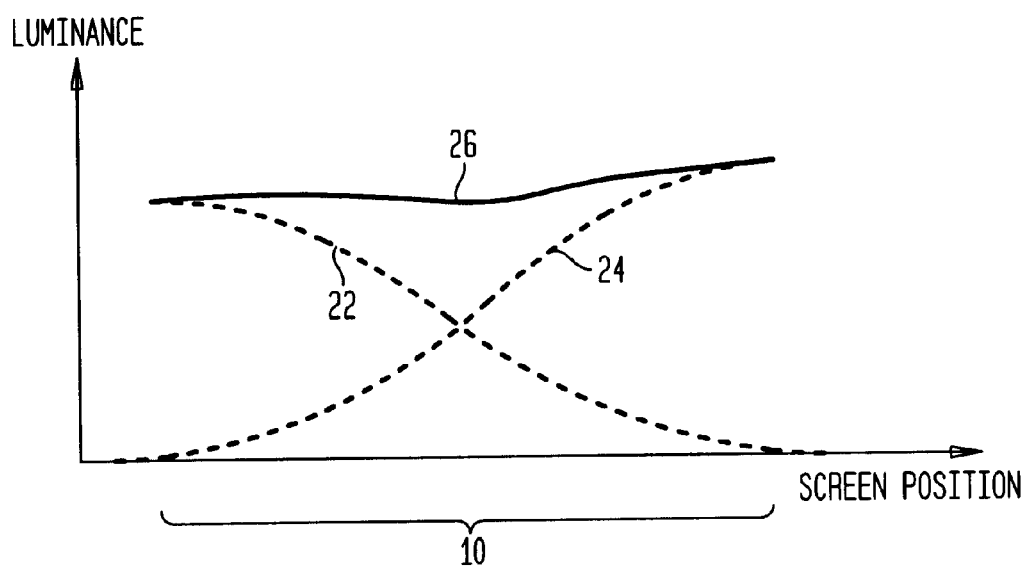
FIG. 2 illustrates the ideal luminance blending for two unbalanced projectors also according to the preferred embodiment of the invention.

FIG. 2 illustrates luminance blending according to the preferred embodiment of the invention that results from two unbalanced projectors. In this case, the luminance of the right projector (24) is somewhat greater than the luminance of the left projector (22) in the overlapped region (10) resulting in a smooth gradual combined luminance (26). This is, of course, highly desirable because of the gradual transition of luminance from one projected region to the next.

Figure 5:
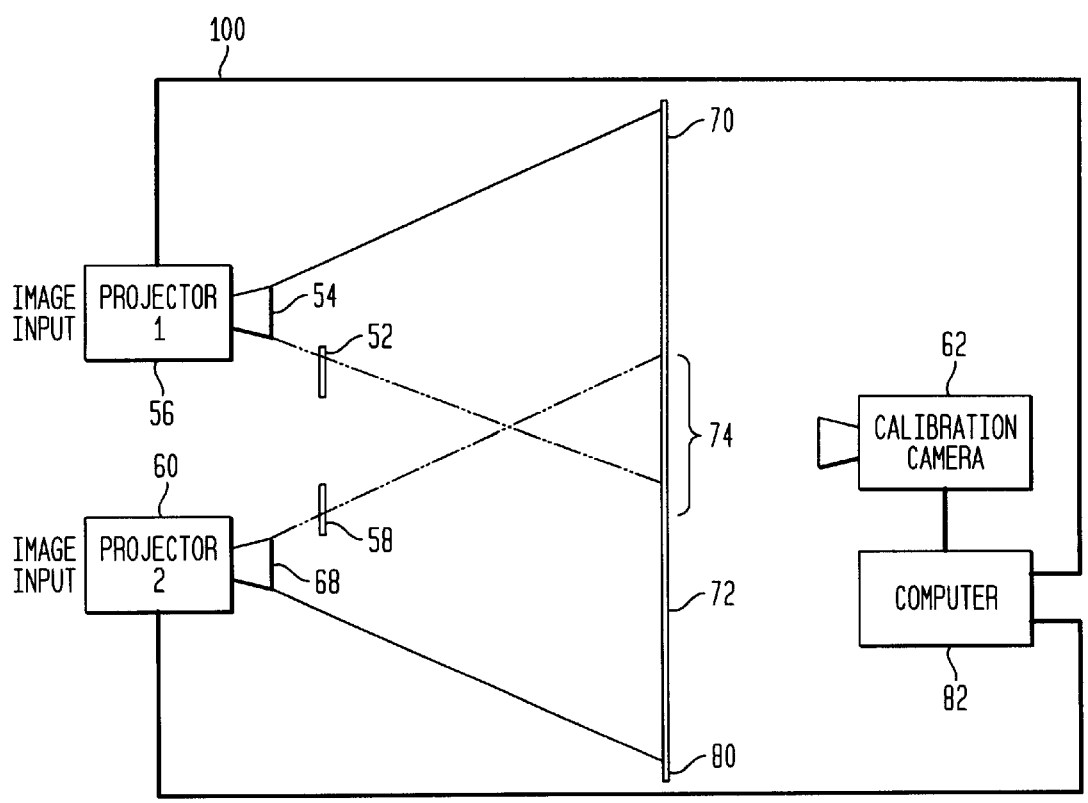
FIG. 5 is a top plan schematic view of the elements of a multi-projector blending system according to the preferred embodiment of the invention.

A portion of a video wall system (100), according to the preferred embodiment of the invention may be more fully understood by reference to FIG. 5. A first projector (56) having a lens aperture (54) projects a first image (70) on a screen (80). Screen (80) would typically comprise a portion of a video wall which could accommodate any number of adjacent images typically in even combinations, such as 4, 8, 12, etc. A second projector (60) having a lens aperture (68) projects a second image (72) on screen (80). Images (70) and (72) overlap in region (74). A first blending frame member (52) occludes a portion of the image (70) that falls in the overlapping region (74). Similarly, a second blending frame member (58) occludes a portion of the second image (72) that falls in region (74). A calibration camera (62) which may be located on the opposite side of the screen (80) from projectors (56) and (60) detects and scans the nature of the image in the overlap region (74). Calibration camera (62) is connected to a computer (82) that in turn controls the images projected from projectors (56) and (60).

Figure 6:
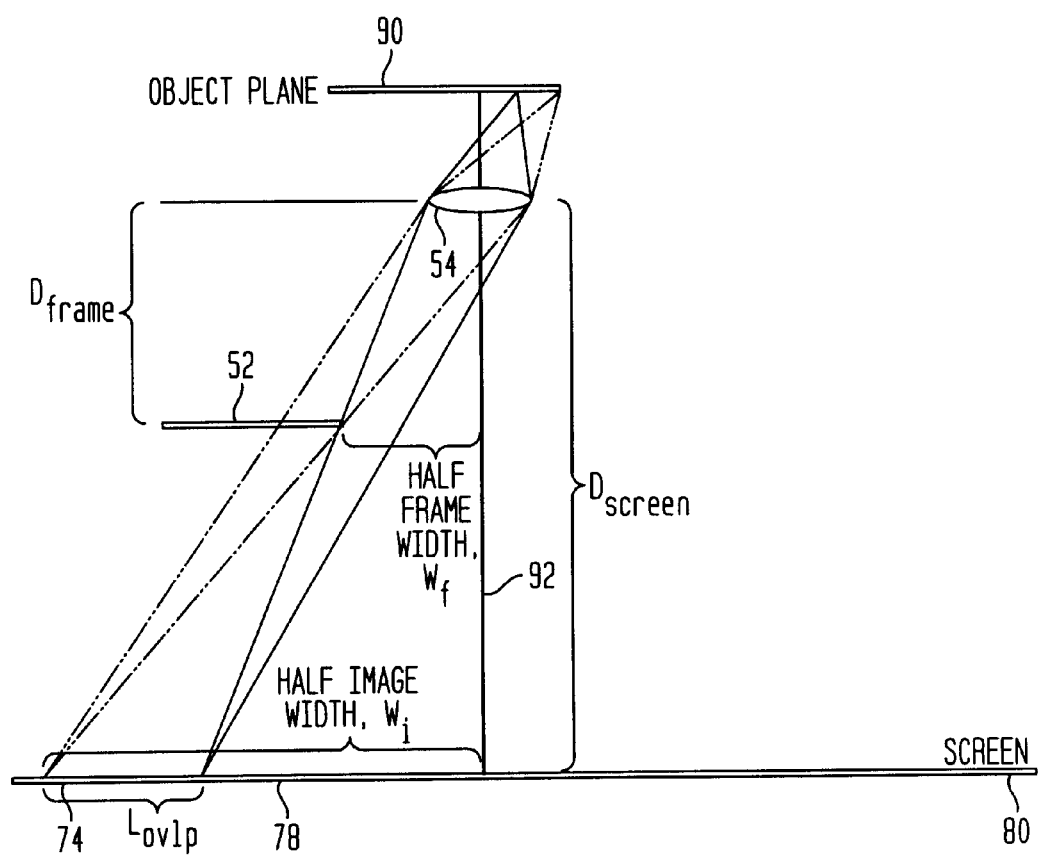
FIG. 6 schematically illustrates the optical path for the overlapped region in which a blending frame, such as shown in FIG. 5 above, is employed to optimally blend the images in the overlapped region.

The physical relationship between the elements illustrated in FIG. 5 may be more fully understood by reference to FIG. 6. FIG. 6 only describes the portion of the image (70) projected by the first projector (56). First projector (56) includes an internal object plane (90) where the original images are produced by well known methods previously described. The lens aperture (54), which has a diameter $D_{lens}$ has a para-axis (92) with a chief ray that is symmetrical around the aperture lens (54) and perpendicular to the screen (80). Aperture lens (54) is located a distance $D_{screen}$ from the video wall screen (80). The first frame (52) is preferably offset a half-frame width $W_f$ and, as shown, occludes a portion of the image (70) that falls into the region of image overlap (74). The overlap region (74) $L_{ovlp}$ is located at its extreme a half-image width $W_i$ from the para-axis (92). The first frame (52) as shown in FIG. 6 is actually only one of four perpendicular elements arranged in a frame-like manner to form a square or rectangular aperture through which the image (72) is projected onto screen (80). See FIGS. 7A and 7B for details.

Ideally the optimal location of the frame (52) from the lens aperture (54) is $D_{frame}$ which is obtained by the following relationship:

$$D_{frame} = \left(\frac{D_{lens}}{L_{ovlp} + D_{lens}}\right) \times D_{screen}$$

In addition, the optimal half-frame width $W_f$ is determined by the relationship:

$$W_f = \left(\frac{D_{lens}}{L_{ovlp} + D_{lens}}\right) \times (W_l + (D_{lens}/2)) - D_{lens}/2$$

The invention also optimally includes two (2) techniques for edge-blending of multiple projectors: a camera-based adaptive algorithm or technique to fine-tune the results, and a camera-based iterative algorithm for reducing or eliminating the defractive effect.

The present invention is based, however, primarily on the technique of aperture modulation. It is know to place an opaque obscuration object in front of a lens (between the exit of pupil and the image plane) to reduce the luminance of an image without distorting itself. It has been discovered, however, that by the careful placing of a rectangular object, specifically the blend frame described herein, that is possible to control the degree of intensity reduction in the overlapped region in the manner suggested by the ideal luminance curves of FIGS. 1 and 2. The present invention employs geometric optics to calculate the effective luminance of the image as a function of the unobstructed portion of the exit pupil or aperture of the camera. As illustrated in FIG. 5, an obscuration object (52) or (58) with a straight edge is placed vertically in front of the exit aperture (54) or (68) of a lens system. The resulting luminance of the image for a given point on the screen can be calculated utilizing the light intensity on the obstructed portion of the exit pupil or aperture. The ratio between this resultant luminance and the original luminance without the existence of the obscuration object is referred to herein as the blending factor $f_b$ for a given image point can be calculated if the luminance distribution on the aperture for a corresponding object point is know. Therefore, the blending factor $f_b$ can be expressed by the following formula, where I (xi) denotes the luminance distribution on the aperture:

$$fb = \frac{\int I(x, y)dxdy, \text{ over unobstructed area}}{\int I(x, y)dxdy, \text{ over whole aperture}}$$

Figure 3:
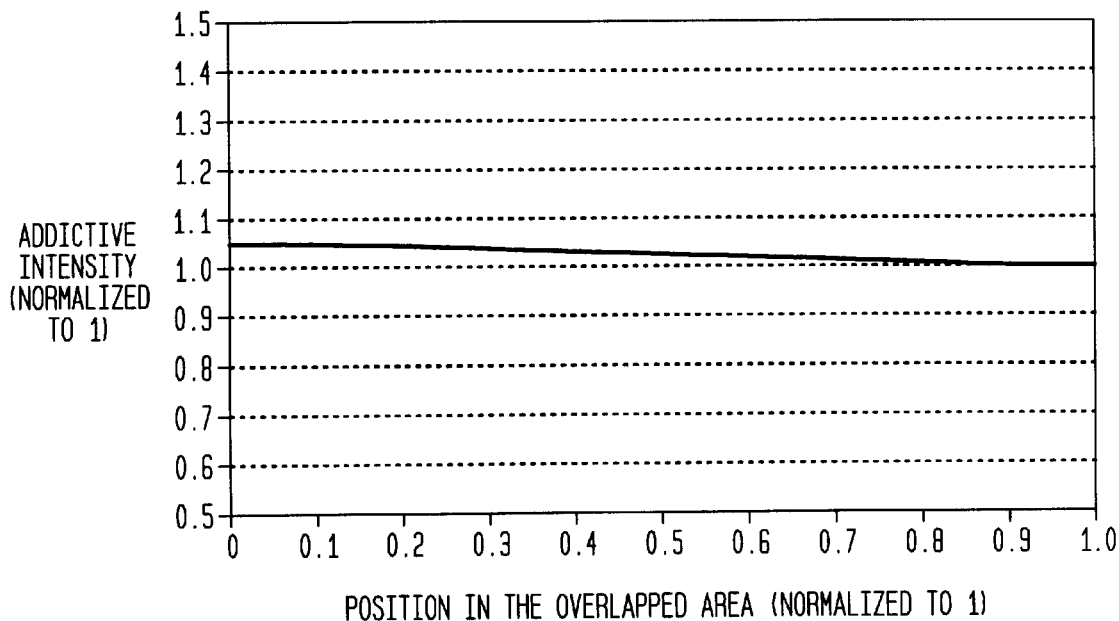
FIG. 3 illustrates the relative intensity of two images in an overlapped area where the projector intensity ratio is 1.05.

It can then be shown by means of Euclidean geometry that for image points aligned on the same vertical (or horizontal) line on the image plane, the unobstructed aperture is the same, given a vertically-placed (or horizontally-placed) obscuration object. This results in the same blending factor for object points that lie on a vertical (or horizontal) line on the object plane. FIG. 3 illustrates the blending factor curves for two adjacent projectors and the combined relative intensity curve assuming constant luminance distribution on the aperture. Detailed calculations can be performed for a real projection system in which the light distribution on the aperture is not constant, but known or measurable.

The invention also comprises the use of digital compensation to fine-tune the results of optical blending. Aperture-modulation achieves decent blending between adjacent projectors. In order to fine-tune the blended result, it is possible to modulate the source's image luminance digitally. This can be accomplished through a direct manipulation of the raw image itself, using texture-mapping hardware or transparency layering which are common on most computer graphics hardware. Since the modulation is very small and only for fine tuning, it does not suffer the "non-zero black-level" problem that a purely digital method does as previously discussed.

The invention also introduces the concept of the use of digital compensation to reduce or eliminate Mach-banding effects. The cause of this problem is the interaction between the aperture modulation mechanism and the light integrator in the projector. The light integrator gathers light from the projector bulb and distributes the light onto the imaging device, i.e., LCD or the Micro-mirror. In order to achieve even light distribution across the surface of the imaging device, the light integrator in modern-day projectors is made of a grid of microlenses, each distributing a cone of light rays onto the entire surface of the imaging device. The present aperture modulation mechanism can be thought of as sweeping a curtain across the light integrator to cover variable amounts of light that illuminate each pixel on the screen. This sweeping motion across a micro-lens grid necessarily discontinues in the illumination and results in a bumpy luminance curve in the overlapped region and hence the Mach banding effect.

Figure 4:
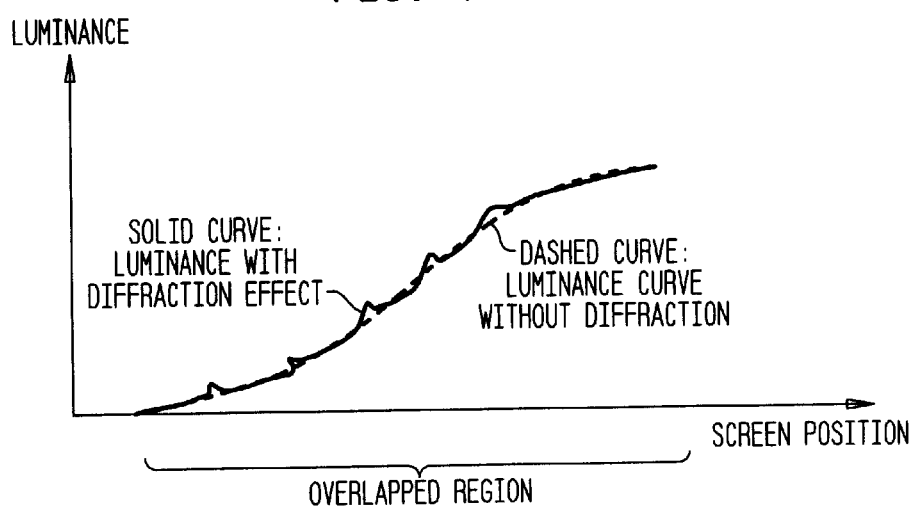
FIG. 4 illustrates luminance blending for unbalanced projectors in which a camera-based Mach band reduction algorithm is employed.

The foregoing effect causes very small fluctuations in relative luminance in the blended area as shown in FIG. 4. The luminance curve without banding effect is represented by the dashed curve. The solid curve represents the actual luminance curve with the light integration effect taken into consideration. The illumination discontinuity manifests itself as small bumps (fluctuations) in the luminance curve. Although fluctuations are small, they do cause perceivable dark and bright bands. For further information, see "Contour and Contrast" by Ratcliff, F., Scientific American, 226 (6), June 1972, 91–101, previously discussed.

The present invention introduces a feedback-based digital compensation technique, shown schematically as calibration camera (62) and computer (82) in FIG. 5, which is necessary because the exact calculation for the effect cannot be easily calculated for a real projection system such as shown in FIG. 5. The feedback information from the first and second projectors (56) and (60) is obtained by calibration camera (62). A program displays a special pattern with uniformity intensity on each of the projectors (56) and (60). The program directs the camera (62) to capture the luminance in the overlapped region (74). The luminance curve captured by the video camera is used to locate the aforementioned luminance fluctuations. The computer (82) then calculates the compensation necessary based upon the magnitude and location of these fluctuations.

The compensation is applied to the source image before it is transmitted to the projector. The application of the compensation is in the form of altering the pixel intensity in the image source in locations where the Mach banding effect is received on the projection screen (80). Altering the pixel intensity in the source image can be accomplished by directly manipulating the pixel values or painting a semi-transparent strip over the image. Such compensation causes the luminance distribution to change on the projection screen (80). This change is detected by the camera (62) and used to determine the effect of the compensation. The compensation process is iterated until a smooth luminance curve is attained. The adjustment to the program is recorded and used as the basis for applying digital compensation to the adjacent projector when displaying real images for video frames.

The invention described is set up and used in the following fashion.

First, a free-space blending frame (52) and/or (58) is placed between a projector's aperture lens (54, 68) and the projection screen (80). The blending frame (52, 58), modulates the luminance intensity in the edge-blended area (74) on the projection screen (80) using the aperture-modulation principles previously described. The optimal values for $D_{frame}$ and $W_f$ are also determined using the relationships previously described.

Second, a digital compensation scheme is employed to reduce or eliminate the diffraction effect.

Third, a computer (82) sends a uniform color bar (the original test image) to the projectors (56, 60). In the blended area (74) the color frames (52, 58) cause the luminance from the projectors (56, 60) to vary from one side of the edge-blended area (74) to the other side.

Fourth, a calibration camera (62), connected to computer (82), is placed on the front side of the projection screen (80) and it records the luminance variation in the edge-blended area. Diffraction patterns are detected by the camera (62).

Fifth, computer (82), connected to calibration camera (62) and projectors (56) and (60), calculates the intensity modulation needed to compensate for the dark bands in the edge-blended area (74). The dark bands, as previously discussed, are caused by diffraction.

Sixth, computer (82) applies a calculated intensity modulation to the original test image in order to compensate for the luminance variation in and around the dark bands.

Seventh, the operation described in steps three, four, and five above are repeated until the luminance distribution in the edge-blended area (74) becomes smooth.

Eighth, the computer (82) records the modulation which has been made to the original test image. The recorded modulation will later be applied to images and video signals to reduce diffraction effects.

Given the foregoing information, it is possible to calculate the necessary parameters for a blending frame (52) such as illustrated in FIG. 7a and 7b. As shown in FIG. 7a, the first projector (56) has a lens (54) the aperture of which is located a distance $H_{lens}$ from the base plate of the projector and a distance of $H_{bot}$ from the bottom of frame (52) and a distance $H_{top}$ from the top of the frame (52). Note also that the frame (52) includes four sides which are not necessarily equal in dimensions to each other. For the purposes of calculation, the following assumptions were made:

$W_f > 8"$ $H_{top} > 11"$ $H_{bot} > 2"$ $11" < D_{frame} < 36"$

The following four examples are calculations made for $D_{frame}$, $W_f$(left), and $W_f$(top) for a variety of different video walls.

EXAMPLE 1

Calculation for a 2×4 Wall, Horizontal Overlap Factor=8.2%

Assumptions:
(1) total screen width=16 ft–192 in.
(2) projector resolution 1024*768
(3) horizontal overlap factor–8.2%=80 pixels=4.7 in
(4) each screen width=57.25 in., height=42.39 in.
(5) total screen height=81.16 in–6.76 ft
(6) true aperture diameter=¾ in=0.75 in.

(7) horizontal half image width $W_{I\text{-}left}=W_{I\text{-}right}=28.63$ in (8) vertical half image width (with a 8:1 ratio)

$W_{I\text{-}top}=38.2$ in, $W_{I\text{-}bot}=4.8$ in.

(9) projector-to-screen distance $D_{screen}=9$ ft

Blending Frame Parameters:

(1) $D_{frame}=0.75/(4.7+0.75)*D_{screen}=0.14$ $D_{screen}=15$ in
(2) $W_{f\text{-}left}=W_{f\text{-}right}=4$ in
(3) Wf-top=5.03 in, Wf-bot=0.35 in

EXAMPLE 2

Calculation for a 3×5 Wall, Horizontal Overlap Factor=5%

Assumptions:

(1) total screen width=18 ft=216 in
(2) projector resolution 1280*1024
(3) horizontal overlap factor=5%=64 pixels=2.25 in
(4) each screen width=45 in, height=33.75 in
(5) total screen height=96.75 in=8.06 ft
(6) true aperture diameter=0.75 in
(7) horizontal half image width $W_{i\text{-}left}=W_{i\text{-}right}=22.5$ in (8) vertical half image width (with a 8:1 ratio)

$W_{i\text{-}top}=30$ in, $W_{i\text{-}bot}=3.75$ in (9) projector-to-screen distance $D_{screen}=8$ ft Blending Frame Parameters:

(1) $D_{frame}=0.75/(2.25+0.75)* D_{screen}=0.25$ $D_{screen}=2$ ft=24 in
(2) $W_{f\text{-}left}=W_{f\text{-}right}=5.35$ in
(3) $W_{f\text{-}top}=7.23$ in, $W_{f\text{-}bot}=0.66$ in

EXAMPLE 3

Calculation for a 3×5 Wall, Horizontal Overlap Factor 5%

Assumptions:

(1) total screen width=18 ft=216 in
(2) projector resolution 1280*1024
(3) horizontal overlap factor=5%=64 pixels=2.25 in
(4) each screen width=45 in, height=33.75 in
(5) total screen height=96.75 in=8.06 ft
(6) true aperture diameter=1.2 in
(7) horizontal half image width $W_{i\text{-}left}=W_{i\text{-}right}=22.5$ in (8) vertical half image width (with an 8:1 ratio) $W_{i\text{-}top}=30$ in, $W_{i\text{-}bot}=3.75$ in (9) projector-to-screen distance $D_{screen}=8$ ft Blending Frame Parameters:

(1) $D_{frame}=1.2/(2.25+1.2)*D_{screen}=0.35$ $D_{screen}$2.8 ft=34 in
(2) $W_{f\text{-}left}=W_{f\text{-}right}=7.1$ in
(3) $W_{f\text{-}top}=10.1$ in, $W_{f\text{-}bot}=0.92$ in

EXAMPLE 4

Calculation for a 3×5 Wall, Horizontal Overlap Factor=10%

Figure 8:
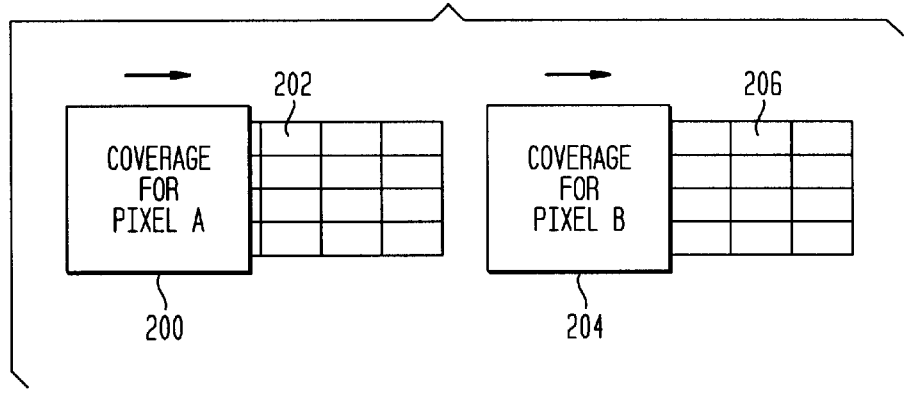
FIG. 8 illustrates the coverage on the light integrator lens array for pixels a and b in an embodiment in which the edge of the blending plate is essentially horizontal to the elements of the micro-lens light integrator.

Assumptions:

(1) total screen width=18 ft=216 in
(2) projector resolution 1280*1024
(3) horizontal overlap factor=10%=128 pixels=4.7 in
(4) each screen width=47 in, height 35.25 in
(5) total screen height=96.35 in=8.02 ft
(6) true aperture diameter=¾ in=0.75 in
(7) horizontal half image width $W_{i\text{-}left}=W_{i\text{-}right}=23.5$ in
(8) vertical half image width (with an 8:1 ratio) $W_{i\text{-}top}=31.3$ in, $W_{i\text{-}bot}=3.92$ in
(9) projector-to-screen distance $D_{screen}=8$ ft Blending Frame Parameters:

(1) $D_{frame}=0.75/(4.7+0.75)*D_{screen}=0.13$ $D_{screen}=12.48$ in
(2) $W_{f\text{-}left}=W_{f\text{-}right}=2.64$ in
(3) $W_{f\text{-}top}=3.69$ in, $W_{f\text{-}bot}=0.18$ in The mach banding effect in the overlapped area is caused by the interaction between the blending plate 200, 204 and the micro-lens light integrator 202, 206. The discontinuities can be viewed as caused by the sweeping motion of the shadow of the blending frame 200, 204 on the micro-lens array 202, 206 as illustrated in FIG. 8. As the coverage of the light integrator sweeps through the micro-lens, the total amount of light passing through experiences a discontinuity in the first derivative right at the boundary between adjacent columns of micro-lenses 202, 206.

Figure 9:
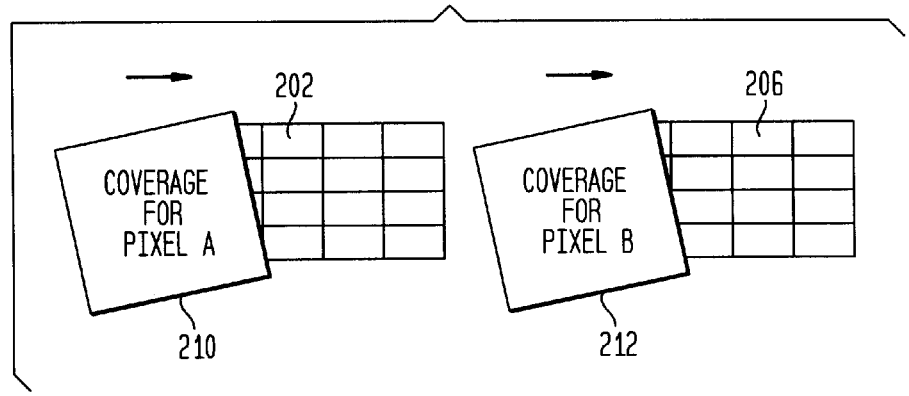
FIG. 9 illustrates an alternative embodiment of the invention in which the blending mask is tilted with respect to the elements of the micro-lens light integrator.
Figure 10:
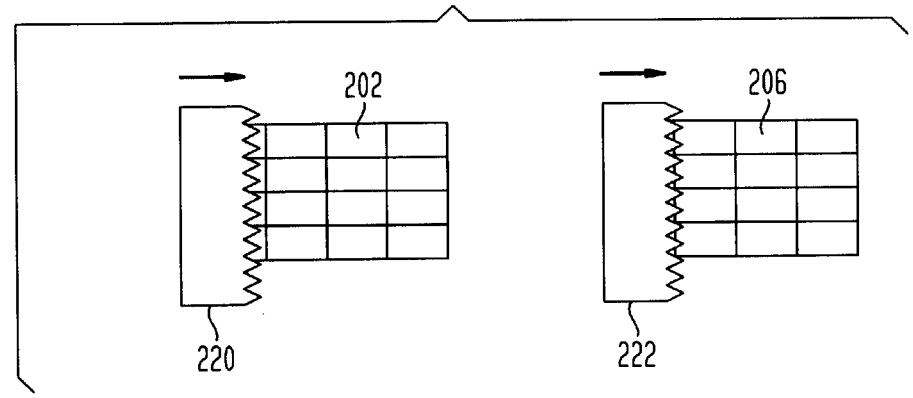
FIG. 10 illustrates another embodiment in which the edge of the blending frame has a saw-tooth pattern.

If, on the other hand, we tilt the blend frame 210, 212 at a slight angle to the micro-lens array 202, 206 as shown in FIG. 9, the coverage from one set of micro-lenses 202, 206 to the next becomes gradual. This was examined experimentally and it was possible to verify this phenomenon in that no visible mach bandings were found. The key to this phenomenon is that the shape of the blending frame can affect discontinuities in the light integrator coverage. The optimal results were obtained with a saw-tooth pattern 220, 222 as show in FIG. 10. When the blend mask 220, 222 sweeps across a new column of micro-lenses 202, 206, the coverage change is a gradual function and only a part of the new column gets covered. The gradual coverage creates a smooth blending of light output between two columns of micro-lenses.

In conclusion, the multi-image video wall method and system described effects the manner in which the overlapping portions of the projected images blend smoothly with each other so as to approach, if not obtain, the ideal luminosity blend as shown in FIGS. 1 and 2.

While the invention has been described with reference to the preferred embodiment thereof, it will be appreciated ordinarily skilled in the art, the various modifications can be made to the elements and steps which comprise the invention without departing from the spirit and scope of the invention as a whole.

What is claimed is:

1. A system for blending a first $I_1$ and a second $I_2$ image as projected onto a screen said system comprising:

a. a first projection means for projecting said first image $I_1$, said first projection means including a first object plane and a first aperture located a distance $D_{screen}$ from said screen;

b. a first frame means located a distance $D_{frame}$ from said first aperture, wherein said first frame means occludes an overlapping portion of said first image $I_1$ that overlaps said second image $I_2$ thereby reducing the intensity of said first image $I_1$ in said overlapping portion;

c. a second projection means for projecting said second image $I_2$, said second projection means including a second object plane and a second aperture located a distance $D_{screen}$ from said screen; and, d. a second frame means located a distance $D_{frame}$ from said second aperture, wherein said second frame means occludes an overlapping portion of said second image $I_2$ that overlaps said first image $I_1$ thereby reducing the intensity of said second image $I_2$ in said overlapping portion and, further, and, wherein the combined intensities of overlapping images $I_1$ and $I_2$ is substantially the same as the intensity of said images in regions adjacent to said overlapping images, wherein said first and second apertures each have a diameter $D_{lens}$ and said images $I_1$ and $I_2$ have a half image width $W_1$ and a region of common overlap $L_{ovlp}$ and, wherein said distance $D_{frame}$ is optimally determined by the relationship:

$$D_{frame} = \left(\frac{D_{lens}}{L_{ovlp} + D_{lens}}\right) \times D_{screen}.$$

2. The system of claim 1, wherein said first and second frames have a half-frame width $W_f$ optimally determined by the relationship:

$$W_f = \left(\frac{Dl_{ens}}{L_{ovlp} + D_{lens}}\right) \times (W_l + (D_{lens}/2)) - (D_{lens}/2).$$

3. A method for blending a first image $I_1$ and a second image $I_2$ that overlap, comprising the steps of:
 a. projecting said first image $I_1$ onto a screen;
 b. projecting said second image $I_2$ onto said screen so that said image $I_1$ and $I_2$ at least partially overlap in a region;
 c. occluding at least part of one image with an occlusion means to decrease the intensity of illumination of at least one of said images in said region of overlap, wherein said occlusion means comprises a first occlusion means for occluding said first image $I_1$ in said region of overlap and a second occlusion means for occluding said second image $I_2$ in said region of overlap;
 d. balancing the intensity of the occluded images $I_1$ and $I_2$ in said region of overlap so that said images $I_1$ and $I_2$ substantially blend in said region with minimal intensity variation with respect to the region directly adjacent to said region of overlap, wherein said images $I_1$ and $I_2$ are created by a first and second projection means respectively, each having an object plane and an aperture located a distance $D_{screen}$ from said screen, said aperture being located a distance $D_{frame}$ from said occlusion means and having a diameter $D_{lens}$ and images $I_1$ and $I_2$ having a half image width $W_l$ and a region of overlap $L_{ovlp}$, and,
 e. setting said distance $D_{frame}$ so that it meets the following relationship:

$$D_{frame} = \left(\frac{D_{lens}}{L_{ovlp} + D_{lens}}\right) \times D_{screen}.$$

4. The method of claim 3 wherein said first and second occlusion means comprise first and second frames each having a half frame width $W_f$ and located a distance $D_{frame}$ from said aperture, said method further comprised in the step of:
 f. setting said half frame width $W_f$ so that:

$$W_f = \left(\frac{D_{lens}}{L_{ovlp} + D_{lens}}\right) \times (W_l + (D_{lens}/2)) - (D_{lens}/2).$$

5. A video wall system for blending at least a first $I_1$ and a second $I_2$ image as projected onto said wall, said system comprising:
 a. a first projection means for projecting said first image $I_1$, said first projection means including a first object plane and a first aperture located a distance $D_{screen}$ from said wall;
 b. a first frame means located a distance $D_{frame}$ from said first aperture, wherein said first frame means occludes an overlapping portion of said first image $I_1$ that overlaps said second image $I_2$ thereby reducing the intensity of said first image in said overlapping portion;
 c. second projection means for projecting said second image $I_2$, said second projection means including a second object plane and a second aperture located a distance $D_{screen}$ from said wall; and,
 d. a second frame means located a distance $D_{frame}$ from said second aperture, wherein said second frame means occludes an overlappin portion of said second image $I_2$ that overlaps said first image $I_1$ thereby reducing the intensity of said second image in said overlapping portion and, further, and, wherein the combined intensities of overlapping images $I_1$ and $I_2$ is substantially the same as the intensity of said images in regions adjacent to said overlapping images,
 wherein said first and second apertures each have a diameter $D_{lens}$ and said images $I_1$ and $I_2$ have a half image width $W_1$ and a region of common overlap $L_{ovlp}$ and, wherein said distance $D_{frame}$ is optimally determined by the relationship:

$$D_{frame} = \left(\frac{D_{lens}}{L_{ovlp} + D_{lens}}\right) \times D_{screen}.$$

6. The method of claim 5 wherein said first and second occlusion means comprise first and second frames each having a half frame width $W_f$ and located a distance $D_{frame}$ from said aperture, said method further comprised in the step of:
 f. setting said half frame width $W_f$ so that:

$$W_f = \left(\frac{D_{lens}}{L_{ovlp} + D_{lens}}\right) \times (W_l + (D_{lens}/2)) - (D_{lens}/2).$$

7. A video wall system for blending at least a first $I_1$ and a second $I_2$ image as projected onto said wall, said system comprising:
 a. a first projection means for projecting said first image $I_1$, said first projection means including a first object plane and a first aperture located a distance $D_{screen}$ from said wall;
 b. a first frame means located a distance $D_{frame}$ from said first aperture, wherein said first frame means occludes an overlapping portion of said first image $I_1$ that overlaps said second image $I_2$ thereby reducing the intensity of said first image in said overlapping portion;
 c. a second projection means for projecting said second image $I_2$, said second projection means including a second object plane and a second aperture located a distance $D_{screen}$ from said wall; and,
 d. a second frame means located a distance $D_{frame}$ from said second aperture, wherein said second frame means occludes an overlapping portion of said second image $I_2$ that overlaps said first image $I_1$ thereby reducing the intensity of said second image in said overlapping portion and, further, and, wherein the combined intensities of overlapping images $I_1$ and $I_2$ is substantially the same as the intensity of said images in regions adjacent to said overlapping images,
 wherein said first and second projection means include micro-lens light integrator means; and, wherein said first and second frame means are tilted with respect to the rows and columns of said micro-lens light integrator means.

8. A video wall system for blending at least a first $I_1$ and a second $I_2$ image as projected onto said wall, said system comprising:
   a. a first projection means for projecting said first image $I_1$, said first projection means including a first object plane and a first aperture located a distance $D_{screen}$ from said wall;
   b. a first frame means located a distance $D_{frame}$ from said first aperture, wherein said first frame means occludes an overlapping portion of said first image $I_1$ that overlaps said second image $I_2$ thereby reducing the intensity of said first image in said overlapping portion;
   c. a second projection means for projecting said second image $I_2$, said second projection means including a second object plane and a second aperture located a distance $D_{screen}$ from said wall; and,
   d. a second frame means located a distance $D_{frame}$ from said second aperture, wherein said second frame means occludes an overlapping portion of said second image $I_2$ that overlaps said first image $I_1$ thereby reducing the intensity of said second image in said overlapping portion and, further, and, wherein the combined intensities of overlapping images $I_1$ and $I_2$ is substantially the same as the intensity of said images in regions adjacent to said overlapping images, wherein said first and second projection means include micro-lens light integrator means; and, wherein said first and second frame means has a saw-tooth pattern in order to create a smooth blending of light output between two columns of said micro-lens light integrator means.

* * * * *